United States Patent

[11] 3,588,515

[72] Inventors Joseph Barbas, Jr.
 Newark;
 Justin V. Paulauskas, Elizabeth, N.J.;
 William C. Peterson, Brooklyn, N.Y.
[21] Appl. No. 849,664
[22] Filed Aug. 13, 1969
[45] Patented June 28, 1971
[73] Assignee Weston Instruments Division
 Newark, N.J.

[54] INSTRUMENT WITH INDICATING AND RELAY MODES OF OPERATION COMPRISING AN ELECTRICAL CONDUCTOR CARRIED BY A FLEXIBLE FILM
15 Claims, 6 Drawing Figs.

[52] U.S. Cl. .............................................. 250/231,
 250/239, 317/124, 324/96, 353/40
[51] Int. Cl. ............................................... G01d 5/34,
 H01h 47/24, H01j 39/12
[50] Field of Search.......................................... 250/230,
 231, 239; 324/96; 317/124; 353/40

[56] References Cited
UNITED STATES PATENTS
3,030,513 4/1962 Bayliss et al. .................. 250/231XUX Primary Examiner—James W. Lawrence
Assistant Examiner—T. N. Grigsby
Attorneys—William R. Sherman, Stewart F. Moore, Jerry M. Presson, Leonard R. Fellen and Arnold, Roylance, Kruger and Durkee ABSTRACT: An instrument having indicating and relay modes of operation, employs an optical system that produces a beam of light for providing an indication on a display screen representative of an input signal parameter and, additionally controls the operation of a relay by electrical signals produced by photoactivation and deactivation of a photodetector. An elongated flexible film having two ends mounts the photodetector adjacent one end thereof. The one film end is movable along and adjacent one screen surface and the electrical signals produced by the detector are transmitted to the relay through an electrical circuit. The circuit includes a plurality of elongated flexible conductive strips mounted on the film and having one end connected to the detector and movable in unison therewith and the other end fixed. This arrangement permits the film to form a loop which facilitates smooth movement thereof along the one screen surface and permits electrical leads from the relay to be readily connected to the fixed ends of the strips in noninterfering relationship with the film.

PATENTED JUN28 1971
3,588,515
SHEET 1 OF 2
FIG. 1
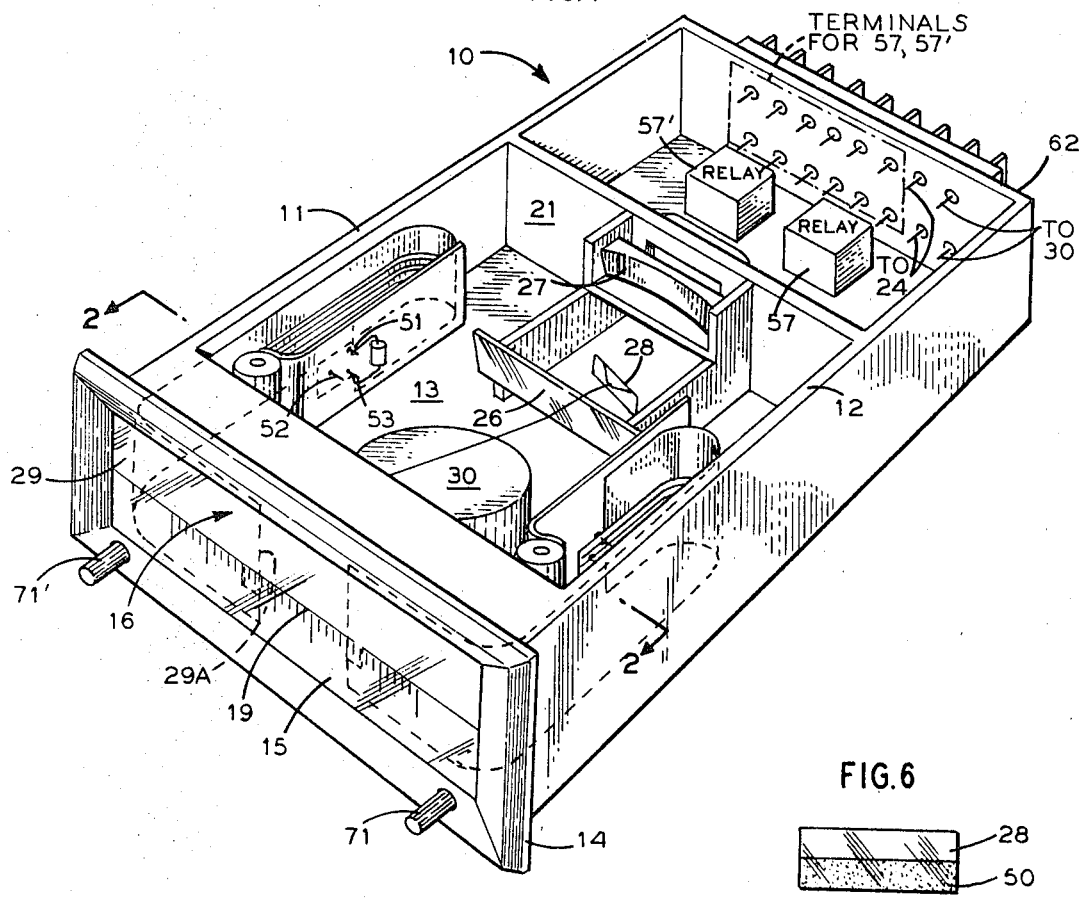
FIG. 6
FIG. 2
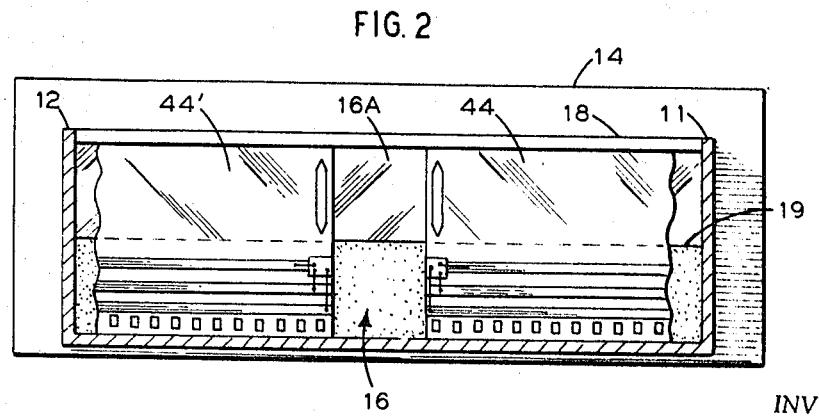
INVENTORS
Joseph Barbas, Jr.
Justin V. Paulauskas
William C. Peterson
BY *[signature]*
ATTORNEY 3,588,515

INSTRUMENT WITH INDICATING AND RELAY MODES OF OPERATION COMPRISING AN ELECTRICAL CONDUCTOR CARRIED BY A FLEXIBLE FILM

This invention relates to apparatus having indicating and relay modes of operation and more particularly, to an electrical instrument of this type which is suitable for mounting in an instrument panel.

Prior-art electrical instruments that function to provide a visual indication of the value of a parameter under measurement and to alter the state of one or more relay devices when measured parameter value attains or exceeds some predetermined value to which the meter is previously set, may be of a type that indicates the value of the measured parameter by illuminating a representative zone of a display screen with a discrete light spot or light bar, the bar as usually distinguished from the spot being elongated in a direction parallel to the major axis of the screen. Both the light spot and the light bar may be descriptively classified as a light "beam" and are therefore referred to as such hereinafter. The beam may serve to illuminate a representative area of the screen and thereby provide a visual indication of the parameter under measurement and moreover to activate one or more photodetectors positioned at a set point for relay operation.

In constructing and assembling prior-art instruments of this type, difficulties are often encountered in mounting the photodetector that it may be moved in a smooth, reliable fashion to positions corresponding to different desired set point values and in physically attaching individual electrical leads or wires to different detector terminals once the detector is mounted in the instrument. Further, upon adjustment of a plurality of set points effected by moving a plurality of photodetectors, the electrical wires connected to the photodetectors are pulled to various positions inside the instrument casing which may create wire entanglements impeding adjustment of the set points and/or interference with other instrument componentry, especially when a plurality of photodetectors are involved. Moreover, the danger of breakage through repeated flexing at the rigid junctions between the wire ends and the terminals of the movable photodetectors is always present.

Additionally, typical prior-art instruments of this type do not have the capability of being readily converted from or to an instrument that performs a combination of indicating and relay functions to or from one that performs only one such function, for instance, the indicating function. Thus, instruments of the type under present consideration usually cannot be utilized for more than their initially intended function without undergoing drastic changes in their internal makeup. This limitation is oftentimes disadvantageous from a commercial standpoint.

It is an object of this invention to provide a new and improved apparatus having indicating and relay modes of operation.

Another object of this invention is to provide a measuring instrument having both indicating and relay modes of operation under the control of a light beam which provides a novel photosensitive set point circuit for controlling the relay mode of operation.

Still another object of this invention is to provide an instrument having the capability of being readily converted from or to an instrument that performs a combination of indicating and relay functions to or from one that performs only one of such functions.

Still another object of this invention is to provide an electrical instrument having indicating and relay operating modes which is suitable for mounting on an instrument panel.

For a better understanding of the present invention, together with other and further objects thereof, reference may be had to the following description taken in connection with the accompanying drawings, the scope of the invention being pointed out in the appended claims.

Referring to the drawings:

FIG. 1 is a perspective view of an instrument constructed in accordance with the instant invention with a cover plate removed to reveal internal instrument parts.

FIG. 2 is a sectional view, taken on lines 2-2 of FIG. 1, with certain parts omitted for clarity.

FIG. 6 illustrates a modified form of a vane having distinct lengthwise portions for respectively producing a light bar display and for triggering a photodetector into a nonconductive state.

BRIEF DESCRIPTION OF INVENTION

Figure 3:
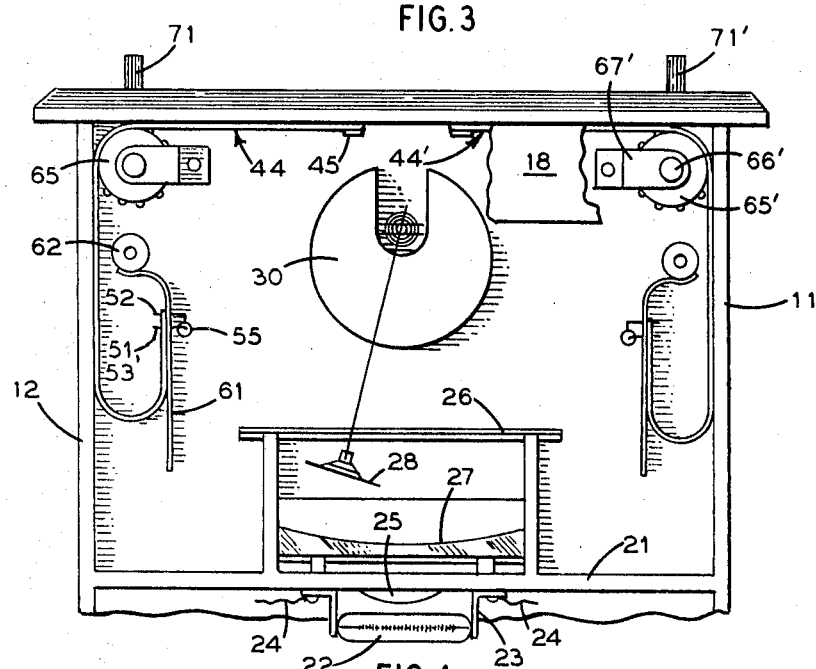
FIG. 3 is a fragmentary plan view of FIG. 1 with portions removed for purposes of clarity.

According to this invention there is provided an instrument which utilizes a light beam to perform indicating and relay switching functions. The instrument includes a screen having an elongated, light-transmitting surface and a film having an elongated light-transmitting portion at least partially covering a corresponding portion of the screen surface. Electro-optical mechanism responsive to a signal parameter displaces the light beam lengthwise along said surface to a screen position which is representative of the signal parameter. A photoelectric device mounted at a predetermined position on the film adjacent the light-transmitting film portion produces an electrical signal when activated by the light beam which signal controls the operation of a relay. Electrically conductive flexible strips mounted stationary on the film adjacent said film portion and movable in unison with film and the device transmits the electrical signal from the device through stationary circuit terminal means to the relay.

Described more specifically, the instant instrument employs a conventional meter optical system mounted within an instrument housing and characterized as being of a type which projects a light beam onto a light-transmitting surface portion of an elongated screen. The position of the light beam on the screen may be viewed from the front end of the instrument housing. The light beam is also used to control the state of a relay through photoactivation and deactivation of at least one relay set point formed by a photoelectric (photosensitive) detector connected in electrical circuit to the relay. The detector is mounted on an elongated, flexible film adjacent one film edge with its photosensitive surface facing the housing interior so as to receive activating radiation from the light beam. The film and detector are movable in unison across one surface of the screen and the film is composed of an electrical insulating material, such as a transparent polyester thermoplastic. Flexible electrical circuits are effected between the relay and the detector by way of a plurality of spaced-apart flexible electrically conductive strips mounted lengthwise on the film adjacent one film edge and electrically insulated from one another by the film.

The film is wider than the light-transmitting portion of the screen and whereas that portion of the film which is movable to overlay this portion of the screen is light conductive in order to transmit the light beam for viewing, the edge portion of the film mounting the flexible circuits and the detector may be hidden from normal viewing by an intervening opaque member, which may take the form of an opaque scale bearing appropriate indicia. With the detector thusly hidden, the position of the detector is accurately determinable by referring to an opaque marker mounted on that portion of the film which overlays the light-transmitting screen portion in position alignment with the detector. For ease of viewing under various ambient light conditions, the marker may be composed of a florescent material.

The end of the film opposite the detector and corresponding terminations of the flexible circuits are fixedly attached to a stationary elongated plate. In addition to serving as a stationary terminal block through which leads from a relay may be connected to the flexible circuits, the plate serves two other functions; namely, that of forming one wall of a storage compartment into which the film may fold easily back upon itself during pay in and payout and as that of a light baffle to spurious internal radiation.

DETAILED DESCRIPTION OF INVENTION

Referring to FIGS. 1 and 2, numeral 10 designates an instrument constructed in accordance with the principles of this invention which includes a rectangular casing sealed against the entry of ambient light, dust and other extraneous matter. The interior of the casing may be coated with a suitable light-absorbing material to absorb extraneous internal light rays.

The casing is formed of two flat, parallel sideplates 11 and 12, a flat bottom plate 13 and a flat top plate, the latter plate being removed in order to reveal internal instrument parts. The front end of the casing mounts a conventional bezel assembly comprising a bezel 14 and a transparent window 15 of overall rectangular shape secured therein. A light-diffusing screen 16 of overall rectangular shape is seated behind the window with the lower edge thereof resting upon an inwardly disposed shoulder 17 formed along the front of the plate 13 and having a right-angled edge 17A, FIG. 5, against which the interior, lower window surface bears. The upper surface of the screen 16 bears against an edge 18A of a frontal support plate 18 joining the plates 11 and 12 and spanning the front end of the plate 13 when the bezel assembly is mounted on the casing; the edges 17A and 18A being substantially coplanar so that the screen 16 mounts perpendicular to the side and bottom plates.

Sandwiched between the window and screen with the lower edge thereof resting upon the shoulder 17 is an opaque scale 19, FIGS. 1 and 2, of substantially rectangular shape having appropriate scale indicia inscribed thereon. The width of the scale 19 is substantially less than that of the screen 16 and is typically one-half the width of the screen leaving a lengthwise rectangular portion 16A of the screen clear of any element which might interfere with light transmission therethrough. The scale indicia are inscribed at spaced-apart points along the upper scale edge to facilitate a visual comparison between light displayed on the screen portion 16A and the contiguous scale indicia.

Currently available discrete photoelectric devices which typically define the relay set points in and of themselves neither possess a memory-capability nor a capability to discern the direction of movement thereacross of an activating light spot. As a result, if the light spot moves to a position beyond the activating zone of the detector, the last position of the light spot relative to the detector is often not known to the detector nor is the initial or starting position of the spot known for a succeeding measurement. Consequently, if the instrument optical system is of a type which projects a spot of light onto the display screen and if this spot is also used to photoactivate one or more spaced-apart photoelectric detectors defining one or more relay set points, conventional practice necessitates connecting suitable memory devices to the outputs of the photodetectors, which devices provide a memory of each least position of the spot. Once this position is known to the relay it can, of course, assume various states that appropriately reflect subsequent movement of the spot across one or more of the established set points.

However, memory devices such as flip-flops and the like, increase the cost and complexity of the instrument and therefore it is often preferred to employ a moving bar or ribbon of light which extends lengthwise of the viewing screen sufficiently to maintain one or more photodetectors which have been swept by the leading edge of the light bar in a state of photoactivation. The final position of the leading edge of the bar is established as being at least beyond that of the detector which is maintained activated by the remaining portion of the bar. Hence, for combined indicating and relay functions, optical systems producing light bar displays, as compared to light spot displays, have the advantage of not requiring memory devices.

One former type of system is described in copending U.S. application Ser. No. 751,436 to Justin V. Paulauskas and Antonio S. Pavia filed Aug. 9, 1968. Since this system may be used to provide a satisfactory light bar for the depicted embodiment of the instant invention, it is described to the extent of its applicability hereinbelow; it being understood, however, that the principles of the present invention also apply to displays of the discrete light spot type and thus optical systems which produce light spots rather than light bars may be employed in the instant instrument.

As best seen in FIGS. 1 and 3, located opposite the screen 16 is a rearward casing wall 21 mounting an incandescent lamp 22 on a pair of metallic clamps 23 which serve to clamp the lamp terminals and additionally, provide part of an electrical circuit through leads 24 between the ends of the lamp filament and an external battery source (not shown) for illuminating the lamp. A condensing lens 25, mounted in an aperture extending through the wall 21 and located centrally thereof, concentrates incident light rays received from the lamp 22 into a beam of visible light which is directed toward the bottom of screen 16 and impinges upon a planar reflecting surface of a rectangular mirror 26 mounted adjacent the plate 13. The light-reflecting surface of the mirror 26 faces the wall 21 and is inclined with respect to the principal axis of the lens system at an angle such that the light incident to the mirror 26 is folded back onto a rearwardly mounted concave mirror 27 from whence it is projected onto the screen 16.

The light projected from the mirror 27 is intercepted by a vane 28 driven in an arcuate path by movement of any suitable mechanism, such as rotation of a D'Arsonval type of meter mechanism 30 mounted stationary on the plate 13; the amount of mechanism and hence vane rotation being a function of the signal parameter causing such rotation. Such a parameter might be the magnitude of an electrical current received by the mechanism via leads from some external source under measurement.

In order to display the signal parameter as a representative ribbonlike light bar 29 on the screen portion 16A, the vane 28 is also made planar with a similar and suitable proportioned rectangular configuration. Color contrast between the displayed rectangular light bar and contiguous illumination is obtained by forming the vane from a transparent color film which transmits an appropriate wavelength or wavelengths of the incident convergent white light. To minimize variations in light intensity across the surface and along the leading edge of the vane, the vane is mounted perpendicular to the focal axis of the beam reflected from the flat mirror 26.

The leading edge 29A of the light bar 29, FIG. 1, is typically a bright and sharply defined, magnified colored image of the corresponding edge of the vane 28 and the remainder of the bar 29 is similarly a bright and sharply defined, magnified image of the adjoining portion of the vane 28 which intercepts the light beam reflected from the mirror 26. The edge 29A forms a sharp, shadow-free interface between it and the projected but unfiltered light rays which are also focused onto the screen by the mirror 26 and along with its adjoining colored bar may be visually compared to the underlying scale indicia to obtain a visual indication of the signal parameter causing rotation of the mechanism 30. With the vane colored red, for example, to provide an easily recognizable color contrast to the all-wavelength or white light background screen illumination, a sharply defined and brightly contrasting colored light image which extends and retracts with vane rotation appears on the screen portion 16A. A visual indication is thereby provided of the angle of rotation of the vane and mechanism; the vane edge 29A advancing, for example, from left to right, as viewed in FIG. 1, with increasing magnitudes of electrical current applied to the mechanism 30 and retracting from right to left with decreasing current magnitudes.

Having now described a known optical system for applying a representative light bar to a display screen, it will be understood that to be of use in the instant invention, the vane 28 must have a width dimension sufficient to project an image onto the lower portion as well as the upper or display portion 16A of the screen 16. This requirement obtains because in accord with the principles of the instant invention, the lower vane image is utilized to change the state of a photodetector mounted stationary on a flexible film; the film carrying a plurality of electrical conductors which follow film extensions and retractions and make direct and continuous electrical connections to terminals of the detector as the photodetector is transported to various desired positions along the lower screen portion. The vane 28 may be further modified in a manner discussed hereinbelow.

Figure 4:
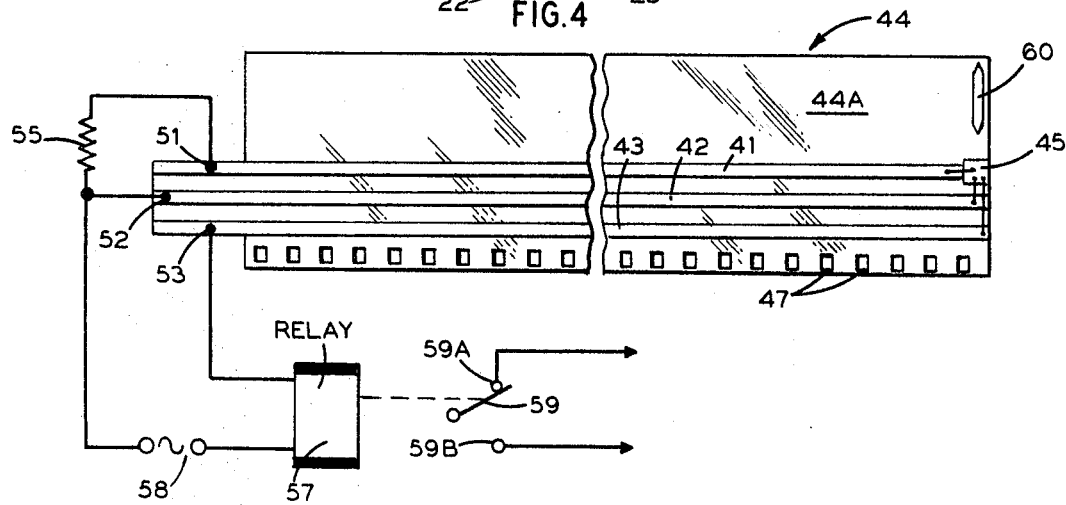
FIG. 4 is a plan view of a flexible, transparent film mounting a photodetector and a flexible electrical circuit for connecting the photodetector to an opposite end of the circuit and additionally illustrates a schematic of an electrical circuit for coupling the opposite end of the flexible circuit to a relay under the control of the photodetector.

Referring to FIG. 4, there is shown a flexible circuit formed by a plurality of laterally spaced, flexible and electrically conductive strips 41, 42 and 43, printed or otherwise formed on one surface of a film 44. The film is composed of an electrically insulative material having good flexiblity in bending about the longitudinal axis thereof. At least the upper portion of the film which moves across the screen portion 16A should have good, and preferably clear, light-transmitting characteristics so as to provide a clear and bright display of the light bar. The film may be composed of a transparent polyester thermoplastic, such as Mylar, of a few mils thickness, which may be perfectly clear or colored to provide a complimentary color hue to the light projected onto the screen portion 16A. The strips 41—43, inclusive, may be formed by bonding parallel lengths of flexible copper foil to one film surface adjacent one edge thereof such as to form a plurality, for instance three, parallel and substantially rectangular conductive lands on the film; the lands being electrically insulated from one another by the film substrate. The film 44 serves not only as a flexible support for the conductive strips but additionally serves as the transport medium for a photodetector or photosensor 45 defining one relay set point. Direct and continuous electrical connection via the strips 41—43 is provided to the movable photodetector element.

The film 44 is depicted as being divided roughly lengthwise in half; the upper half designated 44A in FIG. 4, comprising a light-transmitting film portion similar in size and shape the light-transmitting screen portion 16A. Adjacent this film portion is the aforementioned flexible circuit portion, similar in size and shape to the remaining portion of the screen 16. The overall width of the film 44 is slightly less than that of the screen 16 and the flexible circuit portion of the film is positioned to overlay the scale 19 rather than the screen portion 16A as the film is retracted and extended relative to the screen. To effect film extension and retraction, the film edge adjacent the outermost strip 43 is provided with a longitudinal row of equally spaced sprocket holes 47 which are engaged by teeth of a sprocket gear; the latter being rotated to effect film displacement. The film 44 is designed to be advanced from right to left, as viewed in FIG. 1, and accordingly, the nonsensing end of the detector is fixedly mounted by, for example, a suitable adhesive, to a conductive land and/or to a discrete surface area of the film, closely proximate the leading edge of the film.

The detector 45 is a solid-state light switch which may take the form of a conventional three-terminal, photosensitive silicon-controlled rectifier (SCR) which characteristically changes state, for instance, switches from a nonconductive to a conductive state when the level of radiation incident to its photosensitive surface exceeds some threshold level and then reverses state if the level of incident radiation falls below this threshold level. The device is mounted stationary on the film with its photosensitive surface positioned to receive radiation from the mirror 27 and includes gate, cathode and anode terminals electrically connected to corresponding ends of the strips 41, 42 and 43, respectively. Illumination incident to the detector 45 falls below the threshold triggering level when the image of the vane 28, of reduced light intensity due to filtering, is received by the lower half of the film 44 and covers all or substantially all of the photosensitive surface of the detector 45. Memory of the last position of the light bar edge 29A is provided by reason that the further extension of the light bar merely serves to maintain the detector in the nonconductive state, which state does not change until the vane rotates in a reverse direction sufficiently for the unfiltered light contiguous to the edge 29 to illuminate all or substantially all of the detector. The detector then becomes fully conductive and memory of this detector state is provided by reason of the further extension of the all-wavelength light bar with further vane rotation in said reverse direction.

If the sensitivity requirement for the detector is reduced it is possible to realize an increased latitude in the selection or design of the detector 45. This may be effected by blocking all radiation from the detector when it is covered by the vane image rather than only selected wavelengths of the visible light spectrum. To this end, the lower half of the vane 28 that projects it image onto the lower half of the screen 16 and hence onto the detector 45 is made opaque, the upper vane half remaining transparent to provide a colored light image on the screen portion 16A. FIG. 6 illustrates another embodiment of the vane 28 constructed in accordance with the above having the lower half 50 opaque and the upper half transparent. It is also possible to cover the photosensitive surface of the detector 45 with a filter and provide the lower half 50 with a filter of a complimentary color hue to substantially lessen the response of the detector to extraneous ambient light. To illustrate, if the lower vane half 50 is a red filter the photosensitive surface of the detector might be covered with a blue filter or vice versa.

Referring again to FIG. 4, at the ends of the conductive strips 41—43, inclusive, opposite the leading edge of the film 44 are terminals 51, 52 and 53, respectively, by means of which other electrical conductors may be electrically connected to the strips and hence to different detector junctions. Connected across the terminals 51 and 52 is a biasing resistor 55 which establishes a suitable bias voltage to the gate junction of the detector 45. The voltage appearing across the terminals 52 and 53 determines the state of a bistable relay 57 having one side connected to an energizing AC source 58. The circuit between the terminals 52 and 53 by way of strips 42, 43 and the detector 45 appears as an open circuit to the terminals when rendered nonconductive, that is, not photoactivated and appears as a closed circuit to these terminals when rendered conductive through photoactivation. The operation of relay 57 suitably follows the conductive and nonconductive states of the detector 45, and in turn, operates a switch 59 to control the application of electrical current or voltage to a selected one of the switch contacts 59A and 59B.

Since the conductive strips and the detector are hidden from view by the scale 19 and since the position of the detector relative to the scale establishes the position of the relay set point a marker 60 is mounted or formed on the film portion 44A directly above the detector. This marker is designed to be seen through the screen portion 16A and so as to be readily observable under all ambient light conditions is preferably composed of a florescent material.

The terminals 51—53, inclusive, FIG. 3, affix the corresponding end of the film 44 to a plate 61 mounted inwardly of the sideplate 12 and of a width substantially equal to that of the latter plate. A film storage compartment is created in the space between the plates 12 and 61 and the plate 61 is secured along one end thereof to a post 62 mounted stationary on the plate 13 perpendicular thereto. The post 62 may be internally threaded to receive a screw (not shown) used to affix the cover plate (not shown) to the instrument. The terminals 51-—53, inclusive, are electrically insulated from the plate 61 and are mounted adjacent the front plate end so that the film in the compartment with one end secured to the terminals forms a somewhat compressed loop which tends to flex outwardly and toward the plate 12 with the result that the film adjacent the plate 12 tends to bear lightly against the plate and is therefore in an optimum position for a smooth, jerk-free payout and pay in.

Two plates 61 and 61' may be used as light baffles to block or absorb extraneous radiation internal of the casing, particularly extraneous light reflected off the adjacent casing sideplates onto the screen 16. To increase their light absorption characteristics, plates 61 and 61' are typically blackened. Electrical connections to the terminals 51 and 53 may be made from the innermost surface of the plate 61 so as not to interfere with film movements.

To provide the instrument with two relay set points, for example, a "high" and a "low" set point, a second flexible film, similar to that of the film 44 and the aforedescribed set point circuitry carried thereby, may be extended and retracted across the same surface of the screen 16 in directions toward and away from the film 44 by film drive mechanism essentially identical to that employed to effect extension and retraction of the latter film. This mechanism will be described subsequently. In order to distinguish the second film and its associated drive mechanism from the film 44 and its associated mechanism, numerals referring to the former will bear a prime character. In such case and as shown by, for example, FIG. 3 the resulting instrument will be typically practically symmetrical about the optical axis of the instrument. The second film 44, FIG. 5, similarly mounts the aforedescribed set point circuitry and correspondingly may be clear or colored the same or differently from that of the film 44. In the latter case and with appropriate regard to the light wavelengths derivable from the instrument optical system, different colors may be accorded each zone on the screen portion 16A corresponding to the different scale ranges of the two set points.

The relays 57 and 57' and their associated switching devices may be housed in the instrument casing by providing the casing, FIG. 1, with a rear compartment. The compartment may be designed to be removed from, or added to the rear end of the instrument at will but for expediency is shown as an integral part of the instrument. The compartment includes a wall 62 rearward of the wall 21 which mounts two rows of terminals for the relays 57 and 57' as well as terminals for the lamp 24 and the mechanism 30. The wall 21 is suitable apertured to pass leads between the relays and the film terminals. The instrument 10 with the relays housed therein is especially suitable for panel-mounting applications which often impose severe limitations on the maximum tolerable frontal dimensions of the instrument.

The extension and retraction of either film may be effected by any suitable positive drive means such as a hereinbelow described sprocket and gear drive which is similar to a film drive disclosed in copending U.S. application, Ser. No. 683,322 to Joseph Barbas, Jr. and William N. Watrous, filed Nov. 15, 1967.

Figure 5:
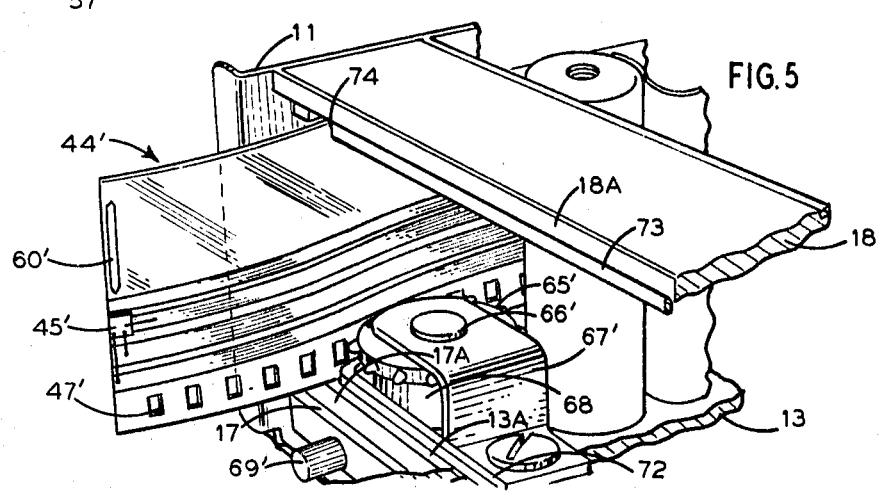
FIG. 5 is an enlarged fragmentary view of the left corner of FIG. 1 showing a drive for extending and retracting the flexible film.

Described briefly, the film drive comprises a sprocket designated 65' in FIG. 5, mounted for rotation on an axle 66' in one corner of the instrument casing close to the juncture of plate 11 and the screen 16. One sprocket end is journaled in a stationary bearing bracket 67' and the opposite end is journaled in the plate 13. The sprocket is fixedly mounted on a concentric crown gear 68' having downwardly extending teeth and is rotated by rotation of a fluted gear shaft 69'. The shaft 69' extends through the shoulder 17 under the crown gear 68' and mounts a gear (not shown) on its interior end for driving the crown gear 68' and thus the sprocket 65'. A hollow set point adjustment knob 71', FIGS. 1 and 3, mounted for rotation in the bezel 14 may be manually forced over the flutes of the shaft 69', when the bezel assembly is mounted on the front of the instrument casing, with a sufficiently tight fit to effect crown gear and sprocket rotation from the exterior of the instrument. The frictional engagement developed between the sprocket axles and their associated brackets and the plate 13 is great enough to maintain the sprockets in positions to which they have been individually rotated by their associated set point adjustment knobs.

Similar drive apparatus for the film 44 and bearing the same numerical designations, in accordance with the aforestated numbering convention, is provided in the corner of the casing near the juncture of plate 12 and the opposite end of the screen 16.

The meshing between the gear shafts and crown gears is such that if the knobs 71 or 71' are rotated counterclockwise as viewed from the instrument front, the sprockets rotate toward the center of the screen and drive the films 44 and 44' to advance toward each other across the screen 16 until each of the markers 60 and 60' align with a scale indicum representing a desired set point value. The lower edge of each film rides in a lower film guideway formed by the lower inner surface of the screen 16 and by a guide rib 72 mounted stationary on the plate 13 and extending parallel to the front edge of this plate slightly rearwardly thereof to define a track 13A having a width slightly greater than the thickness of the films. The ends of the rib 72 follow respective arcuate paths adjacent the hub portions of the crown gears 68 and 68' and are located inwardly of the sprocket teeth to permit unimpeded engagement between the sprocket teeth and the film sprocket holes. A similar guideway is provided for the upper edge of the films and is formed by a guide rib 73 mounted inwardly of the edge 18A a distance slightly greater than the thickness of a film and having a lateral film guiding groove 74 formed in each end thereof. Each groove 74 arcs about an axis coaligned with the axis of rotation of a corresponding sprocket so that the film bends evenly around its associated sprocket and undergoes smooth bending transitions when advanced and retracted.

From the foregoing, it will be evident that the actual fabrication of the flexible set point circuitry on the film may be performed at a convenient location remote from the instrument and that once the circuitry is formed it may be readily inserted and mounted in the instrument and then advanced to any position on the screen. The usual problems of connecting lead ends to the detector terminals while the detectors are mounted in the instrument, lead entanglements with other instrument componentry and breakage at the point of connection to the photodetector terminals now become inconsequential.

It will be evident that the aforedescribed instrument may be converted from or to an instrument having both an indicating and a relay mode of operation to or from one that performs only one of such functions. For example, to convert the aforedescribed instrument into one solely of the indicating type typically involves only the removal of the rearward compartment which houses the relays, their associated contacts and circuits.

Moreover, it will be appreciated that, although the apparatus of FIG. 1 is shown mounted with its longest dimension in a horizontal plane, the apparatus could as easily be rotated 90°, the scale indicia then being similarly oriented so as to be easily readable in that position.

We claim:

1. Apparatus comprising: a member having an elongated, light-transmitting surface; a flexible film having an elongated light-transmitting portion at least partially covering a corresponding portion of said surface; means responsive to a parameter for displacing a beam of light lengthwise along said surface to a position representative of said parameter; means mounted at a predetermined position on said film adjacent the light-transmitting film portion for producing an electrical signal when activated by the light beam; means for utilizing said electrical signal; and electrically conductive means on said film adjacent said film portion for conducting said electrical signal to the signal utilizing means.

2. Apparatus as claimed in claim 1 wherein said electrical conductive means comprises, at least one flexible, elongated conductive strip extending adjacent said film portion and having first and second terminal ends, the first terminal end being fixedly connected to said means for producing an electrical signal and the second terminal end being connected to the signal utilizing means.

3. Apparatus as claimed in claim 2 which further comprises, terminal support means for mounting the second terminal end stationary on said housing, and at least one electrical conductor having two ends, one end connected to said signal-responsive means and the other end mounted stationary on said terminal support means and electrically connected to said second terminal end for conducting said electrical signal to said signal utilizing means.

4. Apparatus as claimed in claim 3 which further comprises guide means extending parallel to one surface of said member for guiding a free end of said film to positions overlying the one member surface, and wherein said means activated by the light beam comprises a photodetector mounted adjacent the free end of said film.

5. Apparatus as claimed in claim 4 wherein said apparatus includes a housing having at least one sidewall forming a corner with said guide means, and wherein said terminal support means comprises, an elongated member spaced from said sidewall a distance sufficient to form a compartment therebetween for storage of said film, said film having a length such that a loop is formed by the film in said compartment which biases film portions between said corner and said loop toward said sidewall.

6. Apparatus as claimed in claim 5 which further comprises, bidirectional film drive means mounted adjacent said corner for extending and retracting said film.

7. Apparatus comprising: a member having an elongated, light-transmitting surface and a longitudinal axis; an element having an elongated light-transmitting portion overlying a longitudinal portion of said surface; means responsive to an applied parameter for illuminating said member with a beam of light elongated substantially parallel to the longitudinal axis of said member, whereby said member provides a representative, barlike indication of said parameter; photoelectric means mounted on the light-transmitting element adjacent said element portion for producing an electrical signal when photoactivated by the light beam; means responsive to said electrical signal; and electrically conductive means on said element for at least partially transmitting said electrical signal to the signal responsive means.

8. Apparatus comprising: a member having an elongated, light-transmitting surface and a longitudinal axis; an element having an elongated, longitudinally disposed light-transmitting portion movable to cover said surface of said member in a direction substantially parallel to the longitudinal axis thereof; means for guiding said element and said light-transmitting portion for movement in said direction; means responsive to a signal parameter for illuminating said member with an elongated bar of light having a longitudinal axis substantially parallel to the longitudinal axis of said member, whereby said member provides a representative, barlike display of said signal parameter; a control device responsive to an electrical signal; photoelectric means mounted on said element adjacent said element portion for producing said electrical signal when photoactivated by the light bar; and electrically conductive means on said element for transmitting said electrical signal to said control device.

9. Display and control apparatus comprising: an elongated, translucent display screen having a longitudinal axis and two end portions, means responsive to a signal parameter for illuminating at least one of the screen end portions with an elongated bar of visible light, the light bar having a lineal dimension substantially parallel to said longitudinal axis which represents said signal parameter; an elongated, flexible film having at least a longitudinally disposed, light-transmitting end portion movable longitudinally with said film over and adjacent one surface of said screen; means for moving said film relative to said screen whereby the film end portion takes different positions on said screen corresponding to different values of the signal parameter; a photoelectric device mounted on said film adjacent said film end portion and positioned to be photoactivated by the light bar; a control device responsive to an electrical signal from said photoelectric device caused by photoactivation thereof; and means for electrically conducting said electrical signal to said control device.

10. Apparatus comprising: an elongated, light-diffusing element having a front surface, a back surface and a longitudinal axis; an elongated, flexible film for transmitting wavelengths of the visible light spectrum for viewing and having first and second end portions; means mounting the first film end portion stationary on the apparatus; bidirectionally drivable means engaging said film for moving the second film end portion adjacent one surface of said element in either one of two directions parallel to the longitudinal axis of said element; means responsive to an input signal parameter for illuminating a representative length of said element and a corresponding portion of said film with a beam of light elongated parallel to said longitudinal axis, whereby a visual representation of the input signal parameter is provided; photoelectric means mounted on the second film end portion for receiving radiation from the light beam and being photoactivated thereby; electrical conductor means mounted on said film for electrically connecting said photoelectric means to said second film end portion; and utilization means electrically coupled to said photoelectric means by way of said second film end portion and said electrical conductor means and responsive to the photoactivation of said photoelectric means.

11. An instrument for providing a light display representing an input signal value and a relay function and characterized as having plural adjustable relay set points comprising: a housing having an elongated frontal aperture therein; a member mounted in said aperture having an elongated light-diffusing screen for displaying signal values under measurement; first and second elongated and flexible films, each of said films having first and second end portions and including a longitudinal film edge portion for transmitting therethrough at least selected bandwidths of the visible light spectrum; a photoelectric device mounted on the first end portion of each film adjacent one side of said film edge portion; means for displacing said first and second films longitudinally so that the first film end portions are movable to different positions relative to said screen; means for guiding said films across a display surface of said screen parallel to the longitudinal axis thereof such that each of said film edge portions covers a preselected portion of said screen; optical means for illuminating the screen surface and corresponding screen-covering film edge portions with a beam of light movable on said screen to a position which represents the input signal value, each of the photoelectric devices having a photosensitive surface disposed to receive radiation from the light beam and said photoelectric devices producing electrical signals when corresponding photosensitive surfaces receive radiation therefrom; means for mounting the second end portions of said films stationary on the instrument; relay means responsive to electrical signals from said photoelectric devices; flexible, electrical signal-conducting means mounted stationary on each of said films coupled to a corresponding one of said photoelectric devices and extending along each film in juxtaposed relationship to a corresponding film edge portion; and means for electrically coupling said relay means to said signal conducting means.

12. An instrument as claimed in claim 11 wherein said signal-conducting means comprises a plurality of mutually parallel, elongated metallic elements mounted stationary on each film throughout the lengths thereof and extending substantially coextensively of a corresponding film in directions parallel to the longitudinal film axis, said elements having good flexibility in bending about the longitudinal axis thereof and bending in unison with said film.

13. An instrument as claimed in claim 11 wherein said film is composed of a transparent thermoplastic polyester and wherein said elements are composed of copper foil of less than 3 mils thickness.

14. The instrument as claimed in claim 12 wherein said housing includes two substantially parallel sidewalls forming different corners with the film-guiding means, and further wherein the means mounting the second end portions of said film stationary on the instruments comprises, first and second plates mounted on said housing inwardly of a respective one of said sidewall so as to define first and second film storage compartments adjacent each of said sidewalls, a plurality of terminals mounted on each plate and electrically insulated therefrom at a point proximate said guiding means so that each film forms an open loop in a storage compartment which resiliently urges the film portion between the loop and a corresponding one of said corners into contact with a corresponding sidewall, and film drive means mounted in each corner engaging an edgewise portion of each film adjacent said signal conducting means for extending and retracting said films.

15. The instrument as claimed in claim 14 wherein said relay means comprises a plurality of relay devices having electrical leads electrically connected thereto and to said elements through said terminals and further wherein said housing includes a compartment located opposite said screen for enclosing said relay devices.